United States Patent [19]

Liu et al.

[11] 4,456,725

[45] Jun. 26, 1984

[54] COMPOSITIONS COMPRISING POLYCARBONATES, ACRYLATE RESINS, AND ALIPHATIC HYDROCARBONS

[75] Inventors: Ping Y. Liu, Naperville, Ill.; Niles R. Rosenquist, Evansville, Ind.

[73] Assignee: General Electric Company, Mt. Vernon, Ind.

[21] Appl. No.: 451,406

[22] Filed: Dec. 20, 1982

[51] Int. Cl.$^3$ .................. C08K 5/01; C08L 69/00
[52] U.S. Cl. ................... 524/476; 524/474; 524/477; 524/481; 524/487; 524/508; 525/146; 525/148
[58] Field of Search ............... 524/508, 474, 477, 481, 524/487, 476; 525/146, 148

[56] References Cited

U.S. PATENT DOCUMENTS

| | | | |
|---|---|---|---|
| 4,263,416 | 4/1981 | Liu et al. | 525/148 |
| 4,313,873 | 2/1982 | Lim | 525/146 |
| 4,320,148 | 3/1982 | Liu | 525/148 |
| 4,340,683 | 7/1982 | Liu | 525/148 |

OTHER PUBLICATIONS

Chem. Abs. 82-126101v (1975), 70JP-120808≡J74034748 (1974), Kato et al.; Mitsubishi Rayon Co. Equiv., Derwent 72050v/41.
Chem. Abs. 80-15874p (1974), 70JP-030520≡J72041093 (1972), Kohda et al.; Mitsubishi Rayon Co. Equiv. Derwent 73735t/46.

Primary Examiner—Herbert J. Lilling
Attorney, Agent, or Firm—Martin B. Barancik

[57] ABSTRACT

A composition of an aromatic of an aromatic carbon polymer, an acrylate impact modifier and an aliphatic hydrocarbon low temperature impact modifier.

11 Claims, No Drawings

COMPOSITIONS COMPRISING POLYCARBONATES, ACRYLATE RESINS, AND ALIPHATIC HYDROCARBONS

BACKGROUND OF THE INVENTION

It is well known that high molecular weight aromatic polycarbonate resins have excellent impact strength below a critical thickness of about 0.20 inch. Above this critical thickness the impact strength of these polycarbonate resins drops precipitously. Various impact modifiers are known to dramatically increase the "thick section", ¼ inch, impact of these polycarbonates. Some of these impact modifiers include polyolefins, U.S. Pat. No. 3,431,224 butadiene containing polymers, U.S. Pat. No. 3,880,783 and acrylate containing polymers, U.S. Pat. No. 4,299,928. However even with these impact modifiers present in the polycarbonate composition, the low temperature impact strength of the composition still reflects the polycarbonate tendency to lose impact strength and become embrittled as temperature decreases, particularly below 5° C.

A series of ternary compositions including polycarbonate has recently been patented which shows increased impact strength at low temperatures as well as normal temperatures. These compositions all have polycarbonate, an acrylate methacrylate copolymer particularly of the "core-shell" type and a third component which significantly increases the thin section impact strength at low temperatures. Examples of third components which accomplish this are olefin-acrylates, U.S. Pat. No. 4,260,693; polyolefins, U.S. Pat. No. 4,245,058, silicone oils, U.S. Pat. No. 4,263,416; polyethylene oxide, U.S. Pat. No. 4,340,683; and polyester, U.S. Pat. No. 4,320,212. However, ease of processability, is generally not mentioned.

Various alkanes and paraffin waxes have been used as lubricants for aromatic polycarbonate. However, accompanying the lubricating qualities is a significant decrease in the composition's impact strength as well as embrittlement in comparison to the polycarbonate per se.

It has now been discovered that when aliphatic hydrocarbons are in admixture with polycarbonate and an acrylate impact modifier, the thick section impact and ductility of the binary composition at normal temperature is essentially maintained while the thin section (⅛ inch) impact and ductility of the binary composition at reduced temperatures is substantially improved. In addition the new composition is easier to process as shown by substantially reduced melt viscosity by melt flow Index.

DESCRIPTION OF THE INVENTION

In accordance with the invention there is a composition which comprises in admixture
 a. a major amount of aromatic carbonate polymer;
 b. a minor amount of an acrylate resin which is sufficient to impact modify the aromatic carbonate polymer;
 c. a minor amount of an aliphatic hydrocarbon of molecular weight less than about 1,000 which is sufficient to impact modify the composition of a and b at low temperatures.

In addition the presence of component c above brings about substantially more processable composition.

DETAILED DESCRIPTION OF THE INVENTION

Aromatic carbonate polymers are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl)-propane, 4,4-bis(4-hydroxyphenyl)heptane, 2,2(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154 incorporated by reference. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bis-haloformates of ethylene glycol, neopentyl glycol, polyethylene glycol, etc.). While other carbonate precursors will occur to those skilled in the art, carbonyl chloride, also known as phosgene, is preferred.

The polcarbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (polyfunctional phenols) or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

The acrylate resin employed in impact modifying amounts is any acrylate known to impact modify aromatic carbonate polymer as measured in thick section. These acrylate resins can be made by known methods and some of them are available from commercial sources. In general any of the polyalkyl acrylates described in Brinkmann et al., U.S. Pat. No. 3,591,659 incorporated by reference, can be used, especially those containing units derived from n-butyl acrylate. Acrylate containing copolymers wherein the other monomer is, for example, derived from a methacrylate are also readily employable, see for example Japanese Patent Application Announcement No. 1968-18611, incorporated by reference. Preferably the acrylate resin will be in the form of a rubber-elastic graft copolymer having a glass transition temperature below about −20° C., see Schlichting, U.S. Pat. No. 4,022,748, incorporated by reference. More preferably, the acrylate resin will comprise a multiple stage polymer having a rubbery first stage (core) and a thermoplastic hard final stage (shell), see Farnham U.S. Pat. No. 4,096,202, incorporated by reference.

The most preferred acrylate resin is a multiphase composite interpolymer comprised of a $C_{1-5}$ acrylate and a $C_{1-5}$ methacrylate. These interpolymers consist of about 25 to 95 weight percent of a first elastomeric phase polymerized from a monomer system comprising about 75 to 99.8 weight percent of a $C_{1-5}$ alkyl acrylate, 0.1 to 5 percent by weight cross linking monomer, 0.1 to 5 percent by weight of graftlinking monomer, and about 75 to 5 weight percent of a final rigid thermoplastic phase polymerized in the presence of said elastomeric phase.

The crosslinking monomer is a polyethylenically unsaturated monomer having a plurality of addition polymerizable reactive groups all of which polymerize at substantially the same rate of reaction. Suitable crosslinking monomers include polyacrylic and polymethacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizing at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are alkyl group-containing monomers of alkyl esters of ethylenically unsaturated acids such as allyl acrylate, allyl methacrylate, diallyl maleate, diallyl fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate.

The aliphatic hydrocarbon used as the "c" component should be of a molecular weight less than about 1,000. The minimum molecular weight should be such that very little of the material volatilizes under processing and molding conditions and temperatures. Generally, about fourteen, preferably eighteen carbon atoms are present as a minimum. The aliphatic hydrocarbon is preferably saturated although one or two isolated unsaturated bonds may be present in the molecules. The aliphatic hydrocarbon is preferably normal, although some branching may occur. Generally, no more than about ten (10) percent of the total number of carbon atoms should be in a branched position, that is for example, for a branched $C_{40}$ alkane, no more than four (4) carbon atoms should be in branch(es) as opposed to the straight portion of the molecule. The carbon atoms which are in the branched position need not be in only one branch but can each make a separate branch. If unsaturation is present, for example an olefin, the unsaturation can be in the branched portion of the molecule but is preferably in the straight portion. A preferred range of carbon number is from twenty to about sixty carbon atoms inclusive, and more preferably about twenty to about forty carbon atoms, inclusive.

The aliphatic hydrocarbon may be used as a single alkane or olefin or as a blend of two or more molecules. One of the easier handling formulations to employ in the composition of this invention is a paraffin wax, for example, Interwax 125-127, a paraffin wax obtained from International Wax and having a softening point range of 125° to 127° C.

The quantity of each component a, b, and c of the composition is of some significance. The aromatic carbonate polymer should constitute a major proportion of the composition. Generally, it is at least about eighty weight percent of the total of a, b, and c. Preferably, the quantity of aromatic carbonate polymer is above about ninety weight percent and even more preferably above about ninety four weight percent.

The amount of acrylate resin is sufficient to impact modify in thick section test systems (¼ inch) the aromatic carbonate polymer. Generally, about two weight percent or greater of an acrylate resin is sufficient to bring about impact modification in thick section. More than about fifteen weight percent does not usually bring about significantly greater impact modification in thick section and can potentially adversely alter other properties of the aromatic carbonate polymer. It is preferable to use relatively small quantities of the acrylate resin, from about 2.5 to about six weight percent. Weight percent of acrylate resin is calculated as percent of b in a, b and c.

The aliphatic hydrocarbon is also generally used in relatively small quantities. Generally no more than about five weight percent is used so as to maintain substantially unaffected other properties of the aromatic carbonate polymer. A lower limit of about 0.5 weight percent aliphatic hydrocarbon will generally bring about significant low temperature impact modification accompanied by an increase in the ductility of the composition. It is preferred to use about 0.5 to about 2.0 weight percent aliphatic hydrocarbon and more preferred to employ about 1.0 to about 1.75 weight percent of the material. Weight percent of aliphatic hydrocarbon is c in a, b and c.

In general it is interesting to note that there should be a minimum weight percent of above about four for the combination of components b and c in order to show an appreciably significant effect on the aromatic carbonate polymers.

The composition can be prepared by methods well known in the art. For example, the dry powder or other forms can be co-extruded into pellets prior to molding into appropriate objects.

Other additives in common use in these materials can also be employed if desired. For example with respect to aromatic carbonate polymer, additives which are known to stabilize the resin thermally such as a phosphite can be employed. Hydrolytic stabilizers such as epoxides may also be employed as well as agents which are flame retardants, drip inhibitors, ductility enhancers, antioxidant, solvent resistance enhancers, ultraviolet light stabilizers and various inert fillers. Active fillers and pigments can be used with passivating agents and treatments.

Below are specific examples of the invention. The examples are intended to illustrate but not narrow the inventive concept. All percentages are in weight percent of the total of a, b and c components.

EXAMPLE 1

In the Examples below an aromatic carbonate polymer made from bisphenol A and phosgene was the polycarbonate. The acrylate resin employed is Acryloid KM 330 available from Rohm and Haas which is a "core-shell" polymer having about 80 weight percent n-butylacrylate and 20 weight percent methylmethacrylate and small quantities of cross-linking and graft linking agents. The aliphatic hydrocarbon employed is the paraffin wax Interwax 125-127 available from International Wax. The three components together with 0.05 weight percent of a phosphite are blended together in an extruder at 260° C. Parts are molded from them in dimensions of 2½" by ½" by ⅛" or ¼". Notched Izods were measured by ASTM D256. Double gate was measured by ASTM D256 on a ⅛ inch part made with two injection ports so that a weld line was formed. The melt flow Index of the composition was measured in accordance with a modified ASTM D1238 condition 0. The ductility at break for all the impact results is 100% unless otherwise noted. The notched Izod is reported in ft-lbs/in. of notch. The Double Gate value is reported in ft-lbs. The melt flow is reported in g/10min. The weight percents are as previously defined. Below are the results with the tested compositions:

| Example | Polycarbonate | Acrylate Resin | Aliphatic Hydrocarbon | Notched Izod ⅛" | Notched Izod ¼" | Notched Izod ⅛" (−29° C.) | Double Gate | Melt Flow Index |
|---------|--------------|----------------|----------------------|-----|-----|------------|-------------|-----------------|
| A*      | 100.00       | 0              | 0                    | 14.8 | 1.6° | 2.0°       | >40         | 8.0             |
| B*      | 96.15        | 3.85           | 0                    | 15.2 | 14.1 | 2.6°       | >40         | 7.7             |
| 1       | 95.69        | 3.83           | 0.48                 | 15.2 | 13.8 | —          | >40         | 8.6             |
| 2       | 95.24        | 3.81           | 0.95                 | 15.2 | 13.4 | —          | >40         | 9.5             |
| 3       | 94.79        | 3.79           | 1.42                 | 15.6 | 13.0 | 12.3$^{80}$ | 39.7        | 10.2            |
| 4       | 94.34        | 3.77           | 1.89                 | 15.6 | 13.2 | 7.7$^{40}$ | 39.7        | 10.9            |
| 5       | 93.90        | 3.76           | 2.34                 | 15.9 | 13.0 | 4.6°       |             | 11.8            |
| 6       | 90.0         | 4.00           | 6.00                 | 14.8 | 14.0 | —          | 29.2        | 16.1            |

*Control

As shown in the above Table the addition of the aliphatic hydrocarbon to the two component composition brought about low temperature impact strength not present in the two component system, see Examples 3-5. Substantial ductility at break was also observed with these three component systems. The processability of the system was also substantially improved by addition of the aliphatic hydrocarbon.

What is claimed:

1. A composition which consists essentially in admixture
   a. a major amount of aromatic carbonate polymer;
   b. a minor amount of a rubber-elastic graft copolymer acrylate resin having a glass transition temperature below about −20° C., which is sufficient to impact modify the aromatic carbonate polymer;
   c. a minor amount of an aliphatic hydrocarbon of molecular weight less than about 1,000 which is sufficient to impact modify the composition of a and b at low temperatures, the quantity of a above about 90 weight percent of components a, b and c.

2. The composition in accordance with claim 1 wherein the aromatic carbonate polymer is derived from bisphenol A.

3. The composition in accordance with claim 1 wherein the acrylate comprises n-butyl acrylate.

4. The composition in accordance with claim 1 wherein the acrylate is a multiphase composite interpolymer comprised of $C_{1-5}$ acrylate and $C_{1-5}$ methacrylate.

5. The composition in accordance with claim 1 wherein the aliphatic hydrocarbon is an alkane or blend of alkanes.

6. The composition in accordance with claim 2 wherein the acrylate is a multiphase composite interpolymer comprising a $C_{1-5}$ acrylate and a $C_{1-5}$ methacrylate and the aliphatic hydrocarbon is an alkane or blend of alkanes.

7. The composition in accordance with claim 2 wherein the aliphatic hydrocarbon is from about 0.5 to about 5.0 weight percent of a, b and c.

8. The composition in accordance with claim 6 wherein the aromatic carbonate polymer is above about 90 weight percent, the acrylate is from about 2.5 to about 6.0 weight percent and the aliphatic hydrocarbon is from about 0.5 to about 2.0 weight percent.

9. The composition in accordance with claim 6 wherein the aromatic carbonate polymer is above about 94 weight percent.

10. The composition in accordance with claim 2 wherein the quantity of b and c together is above about 4.0 weight percent.

11. The composition in accordance with claim 9 wherein the quantity of b anc c together is above about 4.0 weight percent.

* * * * *